United States Patent
Goldberg et al.

(10) Patent No.: US 11,446,816 B2
(45) Date of Patent: Sep. 20, 2022

(54) ROBOTIC SYSTEMS AND METHODS FOR ROBUSTLY GRASPING AND TARGETING OBJECTS

(71) Applicant: THE REGENTS OF THE UNIVERSITY OF CALIFORNIA, Oakland, CA (US)

(72) Inventors: Kenneth Yigael Goldberg, Mill Valley, CA (US); Jeffrey Brian Mahler, Berkeley, CA (US); Matthew Matl, El Cerrito, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 280 days.

(21) Appl. No.: 16/642,840

(22) PCT Filed: Apr. 4, 2018

(86) PCT No.: PCT/US2018/026122
§ 371 (c)(1),
(2) Date: Feb. 27, 2020

(87) PCT Pub. No.: WO2019/045779
PCT Pub. Date: Mar. 7, 2019

(65) Prior Publication Data
US 2020/0198130 A1 Jun. 25, 2020

Related U.S. Application Data

(60) Provisional application No. 62/553,589, filed on Sep. 1, 2017.

(51) Int. Cl.
*B25J 9/16* (2006.01)
*G06V 20/64* (2022.01)

(52) U.S. Cl.
CPC ........... *B25J 9/1612* (2013.01); *B25J 9/1697* (2013.01); *G06V 20/647* (2022.01);
(Continued)

(58) Field of Classification Search
CPC .................................. B25J 9/16; G05B 22/19
See application file for complete search history.

(56) References Cited

U.S. PATENT DOCUMENTS 9,321,176 B1   4/2016   Sun et al.
9,393,693 B1   7/2016   Kalakrishnan et al.
(Continued)

OTHER PUBLICATIONS

International Search Report and Written Opinion, PCT/US2018/026122, dated Jun. 19, 2018.
(Continued)

*Primary Examiner* — Kira Nguyen
(74) *Attorney, Agent, or Firm* — McCoy Russell LLP

(57) ABSTRACT

Embodiments are generally directed to generating a training dataset of labelled examples of sensor images and grasp configurations using a set of three-dimensional (3D) models of objects, one or more analytic mechanical representations of either or both of grasp forces and grasp torques, and statistical sampling to model uncertainty in either or both sensing and control. Embodiments can also include using the training dataset to train a function approximator that takes as input a sensor image and returns data that is used to select grasp configurations for a robot grasping or targeting mechanism.

23 Claims, 2 Drawing Sheets

(52) U.S. Cl.
CPC .............. *G05B 2219/39082* (2013.01); *G05B 2219/39505* (2013.01); *G05B 2219/39531* (2013.01); *G05B 2219/39542* (2013.01); *G05B 2219/40053* (2013.01); *G05B 2219/40155* (2013.01); *G05B 2219/40571* (2013.01)

(56) References Cited

U.S. PATENT DOCUMENTS

| | | |
|---|---|---|
| 10,166,676 B1 * | 1/2019 | Hudson .................. B25J 13/085 |
| 10,967,507 B2 * | 4/2021 | Homberg ............... B25J 9/1664 |
| 2007/0255454 A1 | 11/2007 | Dariush |
| 2013/0151007 A1 | 6/2013 | Valpola et al. |
| 2015/0096266 A1 | 4/2015 | Divine et al. |
| 2017/0252924 A1 * | 9/2017 | Vijayanarasimhan ....................... G06N 3/084 |

OTHER PUBLICATIONS

Mahler et al., Dex-Net 2.0: Deep Learning to Plan Robust Grasps with Synthetic Point Clouds and Analytic Grasp Metrics, arXiv:1703:09312, Aug. 8, 2017, https: arvix.org/pdf/1703.09312.pdf?ncid=txtlnkusaolp00000618.

Mahler et al., "Dex-Net 1.0: A Cloud-Based Network of 3D Objects for Robust Grasp Planning Using a Multi-Armed Bandit Model with Correlated Rewards," 10.1109/ICRA.2016.7487342, https://www.goldberg.berkeley.edu/pubs/icra16-submitted-Dex-net.pdf.

* cited by examiner

ROBOTIC SYSTEMS AND METHODS FOR ROBUSTLY GRASPING AND TARGETING OBJECTS

CROSS-REFERENCE TO RELATED APPLICATIONS

This application is a 371 of International Application No. PCT/US2018/026122, filed Apr. 4, 2018, which claims priority to U.S. Provisional Patent Application No. 62/553,589, filed Sep. 1, 2017, the contents of both of which are incorporated by reference herein in their entirety.

TECHNICAL FIELD

The disclosed technology relates generally to robotic systems configured for robustly grasping and/or targeting a variety of objects, e.g., in warehouses or homes, e.g., using grippers or suction cup devices and, more particularly, to using libraries of 3D object models that can be analyzed and statistically sampled to train a robot to grasp and/or target objects with robustness to errors in sensing and control.

BACKGROUND

Picking objects up is such a fundamental skill for robots that it is sometimes difficult to understand how challenging grasping still is. Robots in factories depend on high quality sensor data along with some amount of advance knowledge about the objects that they will grasp. However, it is much more challenging to design a system that can reliably pick up a variety of previously unseen objects, including the infinitely long tail of objects that can be, for any of a number of reasons, difficult to grasp.

One attempt around such problems is to design specialized grasping hardware (such as enveloping grasps or adhesives, for example) to compensate for not completely knowing the best way to pick up a given object, but this limits visibility of the object in the gripper.

Grasping can be simplified when one has an exact model of the object to be grasped and the exact position and location of the object gripper and a gripper that works exactly as expected to work. Sensors are often inaccurate and noisy, and grippers themselves generally have finite amounts of accuracy and precision with which they can be controlled. As such, there is enough uncertainty that consistent robust grasping is a significant, if not unattainable, challenge.

One approach is to use machine learning. One approach is to train a system to predict how robust a particular grasp on a given object will be (e.g., whether the grasp will fail when the object is lifted or moved) using datasets collected from millions of robots grasping millions of objects in millions of physical robot trials. Unfortunately, this is simply not a practical solution.

SUMMARY

Implementations of the disclosed technology can be advantageously used in a variety of industries, such as in connection with robots used for warehouse order fulfillment (e.g., where orders are unique and there can be millions of different products), manufacturing, packing, inspection, marking or otherwise labeling, bin picking, and in homes for menial tasks such as decluttering, for example.

DETAILED DESCRIPTION

Figure 1:
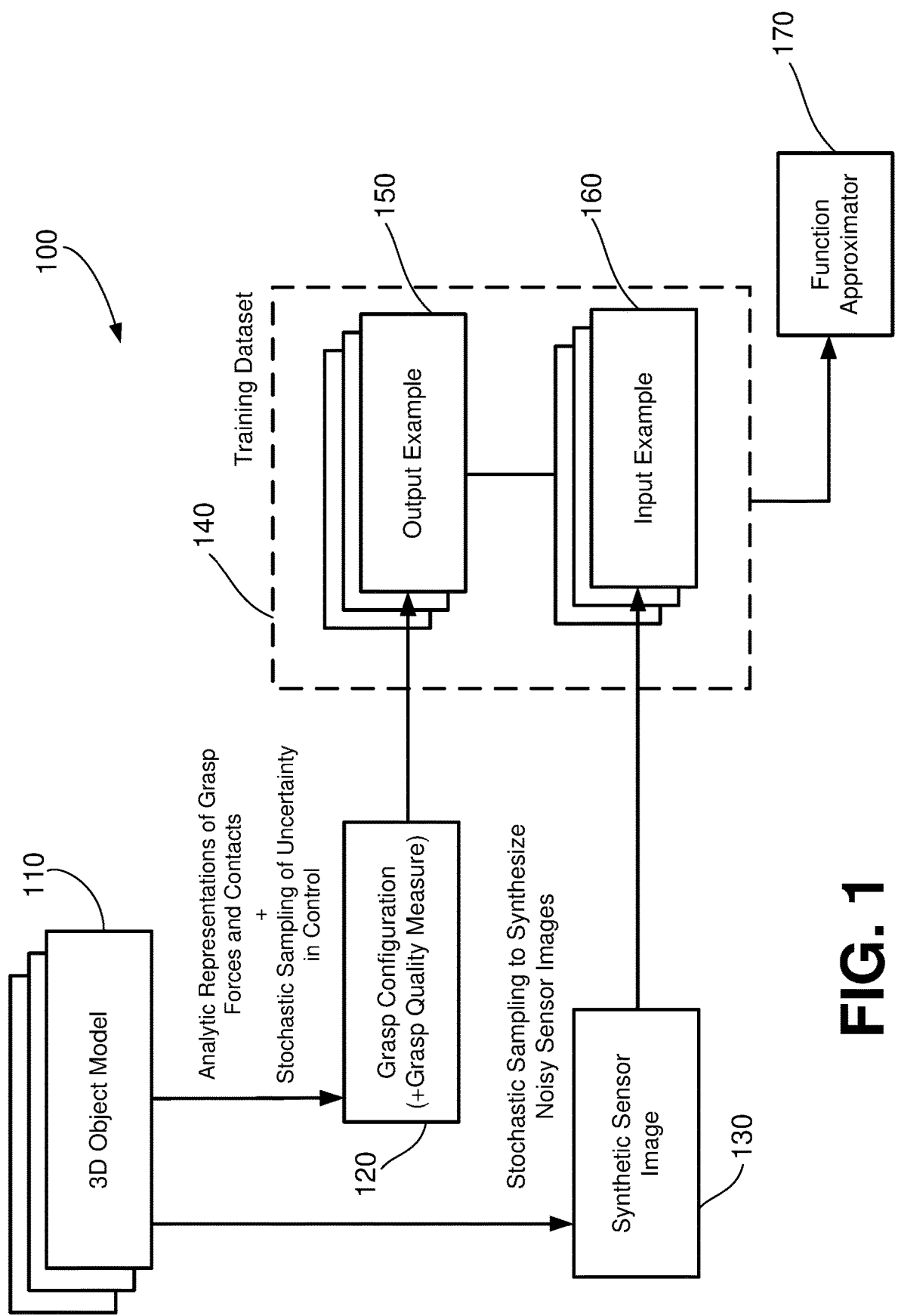
FIG. 1 illustrates an example of a computer-implemented method in accordance with certain embodiments of the disclosed technology.

FIG. 1 illustrates an example of a computer-implemented method 100 in accordance with certain embodiments of the disclosed technology. In the example, the method 100 includes generating a training dataset 140 of labelled examples 150 and 160 of sensor images and grasp configurations using a set of three-dimensional (3D) models of objects 110, one or more analytic mechanical representations of either or both of grasp forces and grasp torques, and statistical sampling to model uncertainty in either or both sensing and control.

The method 100 can also include using the training dataset 140 to train a function approximator 170 that takes as input a sensor image 130 and returns data that is used to select grasp configurations 120 for a robot grasping mechanism. In certain embodiments, grasp configurations may be defined by one or more points relative to the sensor image.

In certain embodiments, the generated training dataset 140 may include a measure of grasp quality associated with a grasp configuration 120. In such embodiments, the measure of grasp quality may include robustness to errors in position or forces. Alternatively or in addition thereto, the measure of grasp quality may include probability of successful lifting of the object.

In certain embodiments, the statistical sampling may include uncertainty in variables related to initial state, contact, physical motion, friction, inertia, object shape, robot control, sensor data, or any suitable combination thereof.

In certain embodiments, the function approximator may be a Convolutional Neural Network (CNN), a Random Forest, a Support Vector Machine (SVM), or a linear weight matrix.

In certain embodiments, the robotic grasping mechanism can include a robot gripper, a multi-fingered robot hand, one or more suction cups, a magnet, adhesive material, or any suitable combination thereof.

In certain embodiments, the set of 3D object models can include mass properties for computation of stable poses for each object. Alternatively or in addition thereto, the set of 3D object models can include mass properties for computation of resistance to either or both of gravity and inertia for a given grasp and object combination. Alternatively or in addition thereto, the set of 3D object models can include material properties for computation including frictional properties, deformation, porosity, color textures for photo-realistic rendering, or any combination thereof.

In certain embodiments, the set of 3D object models may include "adversarial" objects whose geometry makes them difficult to be grasped.

In certain embodiments, the set of 3D object models may be augmented by synthetic product packaging models, such as "skin packs" or "blister packs," for example. Alternatively or in addition thereto, the set of 3D object models may be augmented using transformations of the initial set of object models using any of the following operations: scaling, stretching, twisting, shearing, cutting, and combining objects.

In certain embodiments, the analytic mechanical representations may include wrench mechanics. Alternatively or in addition thereto, the analytic mechanical representations may include any of the following metrics: force closure grasp quality, Ferrari-Canny grasp quality, suction cup contact quality, wrench resistance quality, magnetic contact quality, and adhesive contact quality.

Such implementations may include using computer simulation to estimate grasp quality. Alternatively or in addition thereto, such implementations may include using statistical sampling to compute statistics of a grasp quality metric. In such embodiments, the grasp quality metric may include average, median, moments, percentiles, or any suitable combination thereof. Alternatively or in addition thereto, such implementations may include using statistical sampling to compute the statistics of the grasp quality metric includes using numerical integration.

Certain implementations may include using statistical sampling to generate variations in possible object poses, sensor poses, camera parameters, lighting, material properties, friction, forces, torques, robot hardware parameters to generate the sensor images (e.g., a 3D depth map), or any suitable combination thereof.

Certain implementations may include using computer simulation to generate variations in possible object poses, sensor poses, camera parameters, lighting, material properties, friction, forces, torques, and robot hardware parameters to generate the sensor images (e.g., a 3D depth map), or any suitable combination thereof.

In certain embodiments, the set of object models and the computed grasp configurations for each object model may be stored as a network with one or more computed relationships between object models such as similarity in shape. In such embodiments, the data in the network of object models and the computed grasp configurations for each object model may be used to efficiently compute one or more desired grasp configurations for one or more new object models.

Certain implementations may include communicating over a network, e.g., the Internet, to obtain updated function approximator parameters.

Certain implementations may include updating the parameters of the function approximator based on outcomes of physical grasp attempts.

In certain embodiments, a computer-implemented method may include generating a training dataset of labelled examples of sensor images and target points within those images using a set of three-dimensional (3D) models of objects, one or more analytic evaluation methods of desired target points on an object, and statistical sampling to model uncertainty in either or both sensing and control. The method may also include using the training dataset to train a function approximator that takes as input a sensor image and returns data to compute one or more target points for a robot targeting mechanism (e.g., placing a label on the object, affixing a stamp to the object, and inspecting the object).

In certain embodiments, the statistical sampling may include uncertainty in variables related to initial state, contact, physical motion, friction, inertia, object shape, robot control, sensor data, or a combination thereof.

The function approximator may include a Convolutional Neural Network (CNN), a Random Forest, a Support Vector Machine, or a linear weight matrix.

In certain embodiments, the set of 3D object models can include mass properties for computation of stable poses for each object. Alternatively or in addition thereto, the set of 3D object models can include mass properties for computation of resistance to either or both of gravity and inertia for a given targeting and object combination. Alternatively or in addition thereto, the set of 3D object models can include material properties for computation including frictional properties, deformation, porosity, color textures for photo-realistic rendering, or any combination thereof.

In certain embodiments, the set of 3D object models may include "adversarial" objects whose geometry makes them difficult to be targeted.

In certain embodiments, the set of 3D object models may be augmented by synthetic product packaging models, such as "skin packs" or "blister packs," for example. Alternatively or in addition thereto, the set of 3D object models may be augmented using transformations of the initial set of object models using any of the following operations: scaling, stretching, twisting, shearing, cutting, and combining objects.

In certain implementations, the analytic mechanical representations may include wrench mechanics.

Certain implementations may include using statistical sampling to generate variations in possible object poses, sensor poses, camera parameters, lighting, material properties, friction, forces, torques, robot hardware parameters to generate the sensor images (e.g., a 3D depth map), or any suitable combination thereof.

Certain implementations may include using computer simulation to generate variations in possible object poses, sensor poses, camera parameters, lighting, material properties, friction, forces, torques, and robot hardware parameters to generate the sensor images (e.g., a 3D depth map), or any suitable combination thereof.

In certain embodiments, the set of object models and the computed grasp configurations for each object model may be stored as a network with one or more computed relationships between object models such as similarity in shape. In such embodiments, the data in the network of object models and the computed grasp configurations for each object model may be used to efficiently compute one or more desired grasp configurations for one or more new object models.

Certain implementations may include communicating over a network, e.g., the Internet, to obtain updated function approximator parameters.

In certain embodiments, grasp configurations may be defined by one or more points relative to the sensor image.

Figure 2:
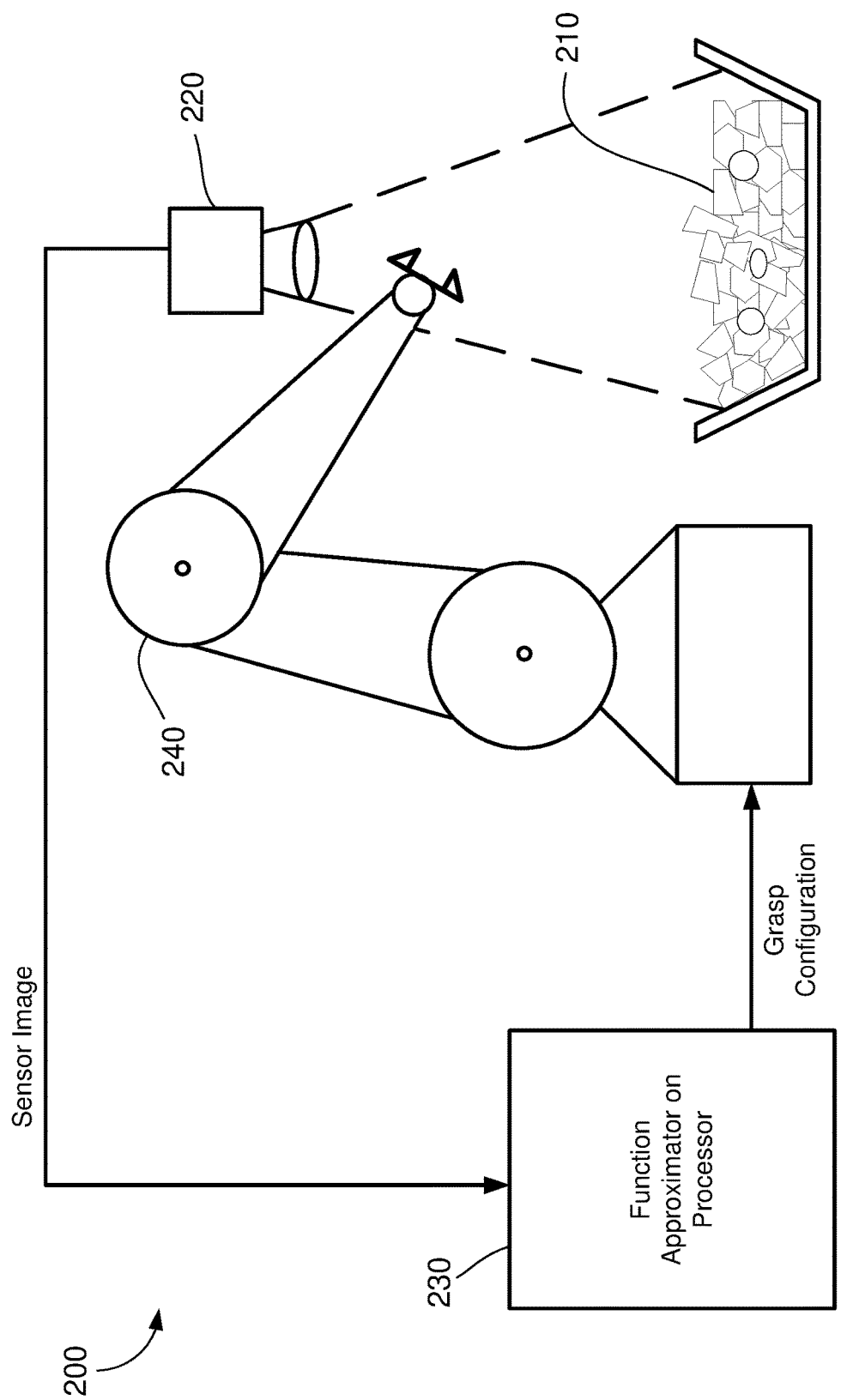
FIG. 2 illustrates an example of a system in accordance with certain embodiments of the disclosed technology.

FIG. 2 illustrates an example of a system 200 for grasping objects 210 in accordance with certain embodiments of the disclosed technology. In the example, the system 200 includes a sensor 220, a robotic grasping mechanism 240, and one or more processors configured to use sensor images to compute a desired grasp configuration for the robotic grasping mechanism 240 based at least in part on a function approximator 230 that is trained on a training dataset of labelled examples of sensor images and grasp configurations using a set of three-dimensional (3D) models of objects, one or more analytic mechanical representations of either or both of grasp forces and grasp torques, and statistical sampling to model uncertainty in either or both sensing and control. In certain embodiments, the function approximator 230 may be configured to take as input a sensor image and return data that is used to compute robust grasp configurations for the robotic grasping mechanism 240.

In certain embodiments, a set of candidate grasp configurations may be computed based on computing potential antipodal grasps from the sensor image, e.g., a 2D image from a camera.

Certain implementations may include obtaining a 3D depth map using a structured lighting system, a Lidar system, a stereo pair of color cameras, a stereo pair of monochrome cameras, a monocular image, or any suitable combination thereof.

Certain implementations may include the use of motion planning methods to avoid robot contact with the environment based on collision checking. Alternatively or in addition thereto, the system may include means for using robot motions to move grasped objects into specific new configurations. Alternatively or in addition thereto, the system may include means for detecting the outcome of grasp attempts. In such embodiments, the system may be configured to detect the outcome of grasp attempts includes using one or more load cells, a light sensor, a camera, a force sensor, a tactile sensor, or any suitable combination thereof.

Certain embodiments may include applying multiple grasping methods in parallel.

Certain implementations may include two or more grasping methods where the outputs of two or more function approximators are combined to select between these grasping methods for a given sensor image.

In certain alternative implementations, the system may include a sensor, a robotic targeting mechanism, and one or more processors configured to use sensor images to compute a desired target configuration for the robotic targeting mechanism based at least in part on a function approximator that is trained on a training dataset of labelled examples of sensor images and target points using a set of three-dimensional (3D) models of objects, one or more analytic mechanical representations of target points, and statistical sampling to model uncertainty in either or both of sensing and control. In such embodiments, the function approximator may be configured to take as input a sensor image (e.g., a 2D image from a camera) and return data that is used to compute robust target points for the robotic targeting mechanism.

Certain implementations may include obtaining a 3D depth map using a structured lighting system, a Lidar system, a stereo pair of color cameras, a stereo pair of monochrome cameras, a monocular image, or any suitable combination thereof.

Certain implementations may include the use of motion planning methods to avoid robot contact with the environment based on collision checking. Alternatively or in addition thereto, the system may include means for detecting the outcome of targeting attempts. In such embodiments, detecting the outcome of targeting attempts may include using one or more load cells, a light sensor, a camera, a force sensor, a tactile sensor, or any suitable combination thereof.

Certain implementations may include applying multiple targeting methods in parallel.

Certain implementations may include two or more targeting methods where the outputs of two or more function approximators may be combined to select between these targeting methods for a given sensor image.

Certain implementations may also include pushing objects to separate them from the environment and create an accessible grasp.

Grasp and target success can be predicted directly from depth images by training a deep Convolutional Neural Network (CNN) on a massive dataset of parallel-jaw grasps, grasp metrics, and rendered point clouds generated using analytic models of robust grasping and image formation.

To reduce data collection time for deep learning of robust robotic grasp plans, a deep neural network can be trained for grasp classification, e.g., from a synthetic dataset of over 6.7 million point clouds, grasps, and robust analytic grasp metrics generated from thousands of three-dimensional (3D) models in randomized poses on a table. The resulting dataset can be used to train a Grasp Quality Convolutional Neural Network (GQ-CNN) model that rapidly classifies grasps as robust from depth images and the position, angle, and height of the gripper above a table.

The Grasp Quality Convolutional Neural Network (GQ-CNN) model can be trained to classify robust grasps in depth images using expected epsilon quality as supervision, where each grasp is specified as a 3D pose and depth relative to a camera. A grasp planning method can sample antipodal grasp candidates and rank them with a GQ-CNN.

An enormous dataset can be used to provide the data to train a neural network to develop highly reliable robot grasping across a wide variety of rigid objects. For example, the dataset can consist of up to or over 6.7 million point object point clouds, accompanying parallel-jaw gripper poses, along with a robustness estimate of how likely it is that the grasp will be able to lift and carry the object. This can be advantageously used in a robust robotic grasping system.

Implementations of the disclosed technology can rely on a probabilistic model to generate synthetic point clouds, grasps, and grasp robustness labels from datasets of 3D object meshes using physics-based models of grasping, image rendering, and camera noise, thus leveraging cloud computing to rapidly generate a large training set for a CNN.

Implementations can include a hybrid approach to machine learning that combines physics with Deep Learning, e.g., by combining a large dataset of 3D object shapes, a physics-based model of grasp mechanics, and sampling statistics to generate many (e.g., 6.7 million) training examples, and then using a Deep Learning network to learn a function that can rapidly find robust grasps when given a 3D sensor point cloud. The system can be trained on a very large set of examples of robust grasps, similar to recent results in computer vision and speech recognition.

In situations where the CNN estimates the robustness to be high, the grasp generally works as expected. For example, in certain experiments with an ABB YuMi (i.e., a two-arm industrial robot), the planner was 93 percent successful in planning reliable grasps and was also able to successfully predict grasp robustness with 40 novel objects (including tricky things like a can opener and a washcloth) with just one false positive out of 69 predicted successes.

Since a robot may have a good idea as to when it will succeed, it may also be able to tell when it is likely to fail. In situations where the robot anticipates a failure, the robot could take appropriate action, e.g., by either poking the object to change its orientation or asking a human for help.

Implementations may be compatible with virtually any 3D camera and parallel-jaw or suction-cup gripper, and may be used to choose a primary grasp axis for multi-fingered grippers.

In certain implementations, certain knowledge specific to the hardware setup, such as the focal length and bounds on where the RGB-D sensor will be relative to the robot, the geometry of a parallel-jaw robot gripper (specified as CAD model), and a friction coefficient for the gripper, may be provided as input to generate a new training dataset specific to a given hardware setup. In such implementations, a GQ-CNN trained on the dataset may have successful performance.

Implementations of the disclosed technology may include using robust analytic grasp metrics as supervision, using the gripper's distance from the camera in predictions, and performing extensive evaluations on a physical robot.

Certain implementations may facilitate development of new architectures for predicting grasp robustness from point clouds, and also to encourage the benchmarking of new methods.

Certain implementations may include automatically generating training datasets for robotic grasping that can be a useful resource to train deep neural networks for robot grasp planning across multiple different robots.

In certain implementations, a robot may be integrated with an artificial intelligence so that it can figure out how to robustly grip objects it has never seen before or otherwise encountered, for example.

In certain implementations, a robot may use a neural network and a sensor (e.g., a Microsoft Kinect 3D sensor) to see a new object and then determine a robust grasp for successfully grasping the object.

Certain implementations may include household robots performing various chores such as vacuuming, doing dishes, and picking up clutter, for example. Such machines will frequently encounter new objects but, by teaching themselves, they can better adapt to their surroundings.

In certain implementations, robots may be communicating via the cloud, e.g., to share information amongst each other, rather than working and learning in isolation. In such implementations, a robot can distribute gained knowledge to other robots that are like it and, in certain embodiments, even entirely different kinds of robots.

As used herein, the Dexterity Network (Dex-Net) generally refers to a research project that includes code, datasets, and algorithms for generating datasets of synthetic point clouds, robot parallel-jaw grasps, and metrics of grasp robustness based on physics for up to or over thousands of 3D object models to train machine learning-based methods to plan robot grasps. Implementations may include developing highly reliable robot grasping across any of a wide variety of rigid objects such as tools, household items, packaged goods, and industrial parts.

Dex-Net 1.0 may be used for learning predictors of grasp success for new 3D mesh models, e.g., to accelerate generation of new datasets. Dex-Net 2.0 may be used for learning Grasp Quality Convolutional Neural Network (GQ-CNN) models that predict the probability of success of candidate grasps on objects from point clouds. GQ-CNNs may be useful for quickly planning grasps that can lift and transport a wide variety of objects by a physical robot.

Certain implementations may include an analytic suction grasp model and metric based on the set of wrenches at the contact interface between the suction cup and rigid object surface and the magnitude of contact wrenches that needed to resist external wrenches due to gravity under perturbations in object pose, center of mass, contact location, friction, and gravity. This metric can be used to generate a dataset of up to or over 6.7 million point clouds, suction grasps, and grasp robustness labels generated from up to or over 1,500 3D object models, and train a Grasp Quality Convolutional Neural Network (GQ-CNN) on this dataset to classify grasp robustness from point clouds.

Having described and illustrated the principles of the invention with reference to illustrated embodiments, it will be recognized that the illustrated embodiments may be modified in arrangement and detail without departing from such principles, and may be combined in any desired manner And although the foregoing discussion has focused on particular embodiments, other configurations are contemplated.

Consequently, in view of the wide variety of permutations to the embodiments that are described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A computer-implemented method, comprising:
   generating a training dataset of labelled examples of sensor images and grasp configurations using:
   a set of three-dimensional (3D) models of objects;
   one or more analytic mechanical representations of either or both of grasp forces and grasp torques; and
   statistical sampling to model uncertainty in either or both sensing and control, the generated training dataset including a measure of grasp quality associated with a grasp configuration, wherein the statistical sampling includes uncertainty in variables related to initial state and contact area;
   using the training dataset to train a Convolutional Neural Network (CNN) that takes as input a sensor image and generates a set of possible grasp configurations that are available for a robot grasping mechanism that includes one or more suction cups;
   evaluating a level of robustness for each of the set of possible grasp configurations; and
   selecting one of the set of possible grasp configurations that has a highest level of robustness.

2. The computer-implemented method of claim 1, wherein the measure of grasp quality includes either or both robustness to errors in position or forces and probability of successful lifting of the object.

3. The computer-implemented method of claim 1, wherein the statistical sampling further includes uncertainty in variables related to at least one selected from a group consisting of: physical motion, friction, inertia, object shape, robot control, and sensor data.

4. The computer-implemented method of claim 1, wherein the statistical sampling includes at least one selected from a group consisting of: mass properties for computation of stable poses for each object; mass properties for computation of resistance to either or both of gravity and inertia for a given grasp and object combination; material properties for computation of at least one of a group consisting of: frictional properties, deformation, porosity, and color textures for photorealistic rendering; and "adversarial" objects whose geometry makes them difficult to grasp.

5. The computer-implemented method of claim 1, wherein the set of 3D object models is augmented using transformations of the initial set of object models using at least one operation selected from a group consisting of: scaling, stretching, twisting, shearing, cutting, and combining objects.

6. The computer-implemented method of claim 1, wherein analytic mechanical representations include at least one metric selected from a group consisting of: force closure level of robustness, Ferrari-Canny level of robustness, suction cup contact quality, wrench resistance quality, magnetic contact quality, and adhesive contact quality.

7. The computer-implemented method of claim 6, further comprising using computer simulation to estimate level of robustness.

8. The computer-implemented method of claim 6, further comprising using statistical sampling to compute statistics of a level of robustness metric using numerical integration, wherein the level of robustness metric includes at least one selected from a group consisting of: average, median, moments, and percentiles.

9. The computer-implemented method of claim 1, further comprising using statistical sampling to generate variations in at least one of a group consisting of: possible object poses, sensor poses, camera parameters, lighting, material properties, friction, forces, torques, and robot hardware parameters to generate the sensor images.

10. The computer-implemented method of claim 1, further comprising using computer simulation to generate variations in at least one of: possible object poses, sensor poses, camera parameters, lighting, material properties, friction, forces, torques and robot hardware parameters to generate the sensor images.

11. The computer-implemented method of claim 1, wherein the set of object models and the computed grasp configurations for each object model is stored as a network with one or more computed relationships between object models such as similarity in shape, and further wherein the data in the network of object models and the computed grasp configurations for each object model is used to efficiently compute one or more desired grasp configurations for one or more new object models.

12. The computer-implemented method of claim 1, further comprising communicating over a network to obtain updated function approximator parameters.

13. The computer-implemented method of claim 12, further comprising updating the parameters of the function approximator based on outcomes of physical grasp attempts.

14. The computer-implemented method of claim 1, wherein grasp configurations are defined by one or more points relative to the sensor image.

15. The computer-implemented method of claim 1, further comprising pushing objects to separate them from the environment and create an accessible grasp.

16. A computer-implemented method, comprising:
generating a training dataset of labelled examples of sensor images and target points within those images using:
a set of three-dimensional (3D) models of objects;
one or more analytic evaluation methods of desired target points on an object; and
statistical sampling to model uncertainty in either or both sensing and control, wherein the statistical sampling includes uncertainty in variables related to at least one selected from a group consisting of: initial state, contact, physical motion, friction, inertia, object shape, robot control, and sensor data; and
using the training dataset to train a Convolutional Neural Network (CNN) that takes as input a sensor image and returns data to compute a single target point for a robot targeting mechanism that includes at least one selected from a group consisting of: placing a label on the object, affixing a stamp to the object, and inspecting the object.

17. The computer-implemented method of claim 16, wherein the set of 3D object models includes at least one selected from a group consisting of: mass properties for computation of stable poses for each object; mass properties for computation of resistance to either or both of gravity and inertia for a given targeting and object combination; and "adversarial" objects whose geometry makes them difficult to target.

18. The computer-implemented method of claim 16, wherein the set of 3D object models includes material properties for computation of at least one of a group consisting of: frictional properties, deformation, porosity, and color textures for photorealistic rendering.

19. An apparatus, comprising:
a sensor;
a robotic grasping mechanism that includes one or more suction cups; and
one or more processors configured to use sensor images to compute a desired grasp configuration for the robotic grasping mechanism based at least in part on a Convolutional Neural Network (CNN) that is trained on a training dataset of labelled examples of sensor images and grasp configurations using:
a set of three-dimensional (3D) models of objects;
one or more analytic mechanical representations of either or both of grasp forces and grasp torques; and
statistical sampling to model uncertainty in either or both sensing and control; wherein the CNN is configured to take as input a sensor image and generate a set of possible grasp configurations that are available for the robotic grasping mechanism, evaluate a level of robustness for each of the set of possible grasp configurations, and select one of the set of possible grasp configurations that has a highest level of robustness.

20. The apparatus of claim 19, further comprising means for using robot motions to move grasped objects into specific new configurations.

21. The apparatus of claim 19, further comprising means for detecting the outcome of grasp attempts using at least one selected from a group consisting of: one or more load cells, a light sensor, a camera, a force sensor, and a tactile sensor.

22. An apparatus, comprising:
a sensor;
a robotic targeting mechanism; and
one or more processors configured to use sensor images to compute a desired target configuration for the robotic targeting mechanism based at least in part on a Convolutional Neural Network (CNN) that is trained on a training dataset of labelled examples of sensor images and target points using:
a set of three-dimensional (3D) models of objects;
one or more analytic mechanical representations of target points; and
statistical sampling to model uncertainty in either or both of sensing and control, wherein the statistical sampling includes uncertainty in variables related to initial state and contact area;
wherein the function approximator is configured to take as input a sensor image and generate a single robust target point for the robotic targeting mechanism by evaluating a level of robustness for each of a set of possible grasp configurations and selecting one of the set of possible grasp configurations that has a highest level of robustness.

23. The apparatus of claim 22, further comprising means for detecting the outcome of target attempts using at least one selected from a group consisting of: one or more load cells, a light sensor, a camera, a force sensor, and a tactile sensor.

* * * * *